(12) United States Patent
Jiang et al.

(10) Patent No.: US 10,690,803 B2
(45) Date of Patent: Jun. 23, 2020

(54) MOBILE SCANNING INSPECTION SYSTEM

(71) Applicant: Nuctech Company Limited, Beijing (CN)

(72) Inventors: Tao Jiang, Beijing (CN); Yanwei Xu, Beijing (CN); Shangmin Sun, Beijing (CN); Yu Hu, Beijing (CN); Weifeng Yu, Beijing (CN); Xuejing Yang, Beijing (CN); Youai Yu, Beijing (CN); Ke Li, Beijing (CN); Defang Meng, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 15/798,569

(22) Filed: Oct. 31, 2017

(65) Prior Publication Data

US 2018/0149769 A1    May 31, 2018

(30) Foreign Application Priority Data

Nov. 25, 2016    (CN) .......................... 2016 1 1063861

(51) Int. Cl.
*G01V 8/26* (2006.01)
*G01V 8/20* (2006.01)
*G01V 5/00* (2006.01)

(52) U.S. Cl.
CPC .............. *G01V 8/26* (2013.01); *G01V 5/0016* (2013.01); *G01V 8/20* (2013.01)

(58) Field of Classification Search
CPC ...... G01V 8/20–26; G02B 26/10; G08G 1/04; G08G 1/16; G08G 1/164–166
See application file for complete search history.

(56) References Cited

U.S. PATENT DOCUMENTS

| 5,128,874 A * | 7/1992 | Bhanu | G01C 21/165 |
| | | | 342/55 |
| 7,486,768 B2 * | 2/2009 | Allman | G01V 5/0008 |
| | | | 378/147 |

(Continued)

FOREIGN PATENT DOCUMENTS

| CN | 200996943 Y | 12/2007 |
| CN | 101183082 A | 5/2008 |

(Continued)

OTHER PUBLICATIONS

European Extended Search Report dated Mar. 29, 2018 in European Patent Application No. 17 19 9447.8.

*Primary Examiner* — Rebecca C Bryant
(74) *Attorney, Agent, or Firm* — Scully Scott Murphy & Presser

(57) ABSTRACT

A mobile scanning inspection system, comprising a vehicle body and an inspection arm including a cross arm and a vertical arm, wherein a first inspection device and a second inspection device are provided on the cross arm; the first inspection device is on the side close to the vehicle body and it emits a first laser inspection plane parallel to the side plane of the vehicle body, and the length of the longest portion of the first laser inspection plane is longer than the length of the vehicle body; the second inspection device is provided on the side close to the vertical arm and it emits a second laser inspection plane parallel to the side plane of the vehicle body and the second laser inspection plane is centered on the vertical arm, and extends a first preset distance and a second preset distance forward and backward.

12 Claims, 7 Drawing Sheets

(56) References Cited

U.S. PATENT DOCUMENTS

| | | | | |
|---|---|---|---|---|
| 8,035,515 | B2* | 10/2011 | Jang | G01S 17/026 340/511 |
| 9,207,324 | B2* | 12/2015 | Loschmidt | G01S 17/08 |
| 2001/0002861 | A1* | 6/2001 | Ichikawa | G01N 21/95684 356/237.1 |
| 2007/0217572 | A1 | 9/2007 | Kotowski et al. | |
| 2011/0038453 | A1 | 2/2011 | Morton et al. | |
| 2013/0039462 | A1 | 2/2013 | Morton | |
| 2014/0226146 | A1 | 8/2014 | Loschmidt | |
| 2017/0025003 | A1* | 1/2017 | Arpin | G01V 8/20 |

FOREIGN PATENT DOCUMENTS

| | | |
|---|---|---|
| CN | 102147487 A | 8/2011 |
| CN | 102336366 A | 2/2012 |
| CN | 203284078 U | 11/2013 |
| CN | 103879741 A | 6/2014 |
| CN | 204086172 U | 1/2015 |
| CN | 104777520 A | 7/2015 |
| CN | 105197801 A | 12/2015 |
| CN | 105445745 A | 3/2016 |
| CN | 105522988 A | 4/2016 |
| CN | 106483578 A | 3/2017 |
| CN | 206353210 U | 7/2017 |
| JP | 2016-40552 A | 3/2016 |
| WO | 01/28813 A2 | 4/2001 |

\* cited by examiner

MOBILE SCANNING INSPECTION SYSTEM

CROSS REFERENCE

The present application claims priority to Chinese Patent Application 201611063861.X, filed on Nov. 25, 2016, the entire contents of which are incorporated herein by reference.

TECHNICAL FIELD

The present application relates to the field of scanning inspection technology, and in particular to a mobile scanning inspection system.

BACKGROUND

Mobile scanning inspection system, such as vehicle-mounted container inspection system, can be used for scanning inspection of containers, etc., applicable to customs, anti-terrorism and other national security areas, with advantages of flexible maneuver, equipment integration, advanced operation and so on. Typically, the mobile scanning inspection system has a collapsible L-shaped inspection arm that includes a horizontal cross arm and a vertical upright arm. When the scanning is performed, the inspection arm is unfolded to form an inspection tunnel, and the object to be inspected such as a container is placed in the inspection tunnel, and the inspection device is placed on the inspection arm so that the object is scanned and inspected when the vehicle body moves.

At the time of inspection, in order to prevent the object to be inspected such as a container or the like from being hit on the vehicle body or the inspection arm, the existing mobile scanning inspection system uses the bumper bar connected to the travel switch to carry out the collision protection for the vehicle body and the inspection arm. During the movement of the vehicle body, when the bumper bar is blocked by the object to be inspected, it causes the travel switch to be actuated, thereby stopping the scanner vehicle to prevent the vehicle body or the inspection arm from hitting the object to be inspected.

However, the anti-collision bumper type of protection scheme only has a protective effect on the object to be inspected that has a height exceeding the height of the bumper and a regular shape. In recent years, more and more customs began to use mobile scanning inspection system to inspect objects with irregular contours such as aviation containers, air trays and others. Anti-collision bumper type of single point protection has been unable to meet the needs of the use.

The above-described information disclosed in the background section is for the purpose of enhancing the understanding of the background of the present application and therefore may include information that does not constitute prior art known to those skilled in the art.

SUMMARY

In view of this, the present application provides a mobile scanning inspection system capable of plane protection on both sides of the inspection tunnel, thereby providing a more comprehensive collision protection and reducing the risk of the vehicle body and the inspection arm being hit.

Other features and advantages of the present application will be apparent from the following detailed description, or in part, by the practice of the application.

According to an aspect of the present application, there is provided a mobile scanning inspection system comprising a vehicle body and an inspection arm including a cross arm and a vertical arm, a first inspection device and a second inspection device are provided on the cross arm; the first inspection device is arranged on the side close to the vehicle body and a first laser inspection plane emitted from the first inspection device is arranged parallel to the side plane of the vehicle body and the length of the longest portion of the first laser inspection plane is longer than the length of the vehicle body; the second inspection device is provided on the side close to the vertical arm, and a second laser inspection plane emitted from the second inspection device is arranged parallel to the side plane of the vehicle body and the second laser inspection plane is centered on the vertical arm, and extends a first preset distance and a second preset distance forward and backward.

According to an embodiment of the present application, the system further comprises: a controller coupled to the first inspection device and the second inspection device; in the scanning inspection process, an object to be inspected is placed between the first laser inspection plane and the second laser inspection plane; the first inspection device and/or the second inspection device issues an alarm signal when the first inspection device and/or the second inspection device inspects an object exceeding a preset size; the controller is configured to stop the movement of the vehicle body when the alarm signal from the first inspection device and/or the second inspection device is received.

According to an embodiment of the present application, the first laser inspection plane is divided into a plurality of inspection regions including a first inspection region, a second inspection region and a third inspection region adjacent to each other, wherein the first inspection region is closest to the rear end of the vehicle body; the alarm signal comprises a first alarm signal, a second alarm signal and a third alarm signal; when the first inspection device inspects the object in the first inspection region, the first alarm signal is issued to indicate that a collision will occur in each of the plurality of inspection regions; when the first inspection device inspects the object in the second inspection region, the second alarm signal is issued to indicate that a collision will occur in each of the plurality of inspection regions other than the first inspection region; and when the first inspection device inspects the object in the third inspection region, the third alarm signal is issued to indicate that a collision will occur in each of the plurality of inspection regions other than the first inspection region and the second inspection region.

According to an embodiment of the present application, the first laser inspection plane is divided into a first inspection region and a second inspection region adjacent to each other, wherein the first inspection region is closest to the rear of the vehicle body; the alarm signal comprises a first alarm signal and a second alarm signal; when the first inspection device inspects the object in the first inspection region, the first alarm signal is issued to indicate that a collision will occur in the first inspection region and the second inspection region; and when the first inspection device inspects the object in the second inspection region, the second alarm signal is issued to indicate that a collision will occur in the second inspection region.

According to an embodiment of the present application, the coverage area of the first laser inspection plane and the coverage area of the second laser inspection plane can be adjusted according to user settings.

According to an embodiment of the present application, the first inspection device and the second inspection device are connected to an electronic equipment network and receive the user settings transmitted by the electronic equipment.

According to an embodiment of the present application, the first inspection device and the second inspection device are both regional laser scanners.

According to an embodiment of the present application, the controller is a PLC.

According to an embodiment of the present application, the first preset distance is equal to the second preset distance and both are 1 meter.

According to an embodiment of the present application, the longest portion of the first laser inspection plane extends a third preset distance before the front head of the vehicle body and a fourth preset distance after the rear end of the vehicle body, respectively.

According to an embodiment of the present application, the system further comprises: an inspection arm support and a third inspection device; the third inspection device is provided on the inspection arm support with a preset height from the bottom plane of an inspection tunnel formed by the cross arm and the vertical arm; the third laser inspection plane emitted from the third inspection device is arranged parallel to the bottom plane of the inspection tunnel; wherein the preset height is set in accordance with the height of the object to be inspected.

According to an embodiment of the present application, the third inspection device is a regional laser scanner coupled to the controller; when the third inspection device inspects an object exceeding the preset height, a signal is output to the controller to instruct the controller to issue an alarm.

According to the mobile scanning inspection system of the present application, the point protection in the prior art is extended to the plane protection, which greatly reduces the probability of collision between the mobile scanning inspection system and the scanned object. And because the coverage of the laser inspection plane is very wide, it is possible for the user to determine whether or not a collision occurs in the stage of the object to be inspected being placed before the start of the scanning, thereby effectively avoiding the risk by prompting. In addition, the anti-collision method for divided regions can directly indicate or show which inspection region has collided, so as to facilitate the subsequent analysis and processing of the operator.

It is to be understood that the foregoing general description and the following detailed description are exemplary only and do not limit the present application.

BRIEF DESCRIPTION OF THE DRAWINGS

The foregoing and other objects, features and advantages of the present application will become more apparent by describing in detail the exemplary embodiments thereof with reference to the accompanying drawings.

DETAILED DESCRIPTION

Figure 1:
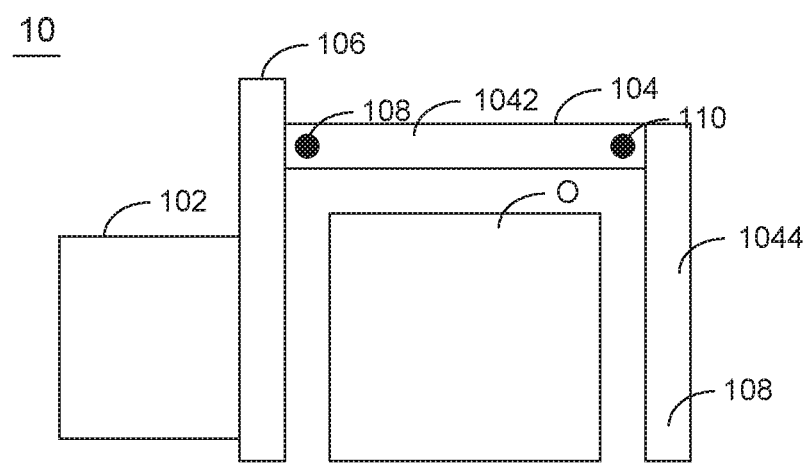
FIG. 1 is a schematic diagram of a mobile scanning inspection system shown in accordance with an exemplary embodiment.

Exemplary embodiments will now be described more fully with reference to the accompanying drawings. However, the exemplary embodiments may be embodied in many forms and should not be construed as limited to the examples set forth herein; rather, these embodiments are provided so that the present application will be more fully and complete, and the teachings of exemplary embodiments will be conveyed comprehensively to those skilled in the art. The drawings are merely illustrative of the present application and are not necessarily to scale. The same reference numerals in the drawings denote the same or similar parts, and thus repeated description thereof will be omitted.

In addition, the features, structures, or characteristics described may be combined in one or more embodiments in any suitable manner. In the following description, numerous specific details are set forth to give a full understanding of the embodiments of the present application. However, those skilled in the art will appreciate that one or more of the particular details may be omitted by practicing the technical solution of the present application, or other methods, components, devices, steps, and the like may be employed. In other instances, well-known structures, methods, devices, implementations, or operations are not shown or described in detail to avoid distracting thus obscuring aspects of the present application.

FIG. 1 is a schematic diagram of a mobile scanning inspection system shown in accordance with an exemplary embodiment. As shown in FIG. 1, the mobile scanning inspection system 10 may be, for example, a vehicle-mounted scanning inspection system including a vehicle body 102, an inspection arm 104, and an inspection arm support 106. Wherein the inspection arm 104 includes a cross arm 1042 and a vertical arm 1044. The inspection arm support 106 is used to support the inspection arm 104. When the scanning is performed, the inspection arm 104 is expanded in an L-shape to form an inspection tunnel in which the object to be inspected O, such as a container, is placed in the inspection tunnel, and the inspection device (not shown) may be placed on the inspection arm 104 so that the object to be inspected O is scanning inspected by the inspection device when the vehicle body 102 moves. In addition, the mobile scanning inspection system 10 can also check the moving vehicle, the vehicle body 102 remains stationary, and the moving vehicle moves through the inspection tunnel formed by the inspection arm 104 to subject to the scanning of the inspection device. When the scanning is completed, the inspection arm 104 is retracted on the top of the vehicle body so that the mobile scanning inspection system 10 can travel like a normal vehicle.

Figure 2:
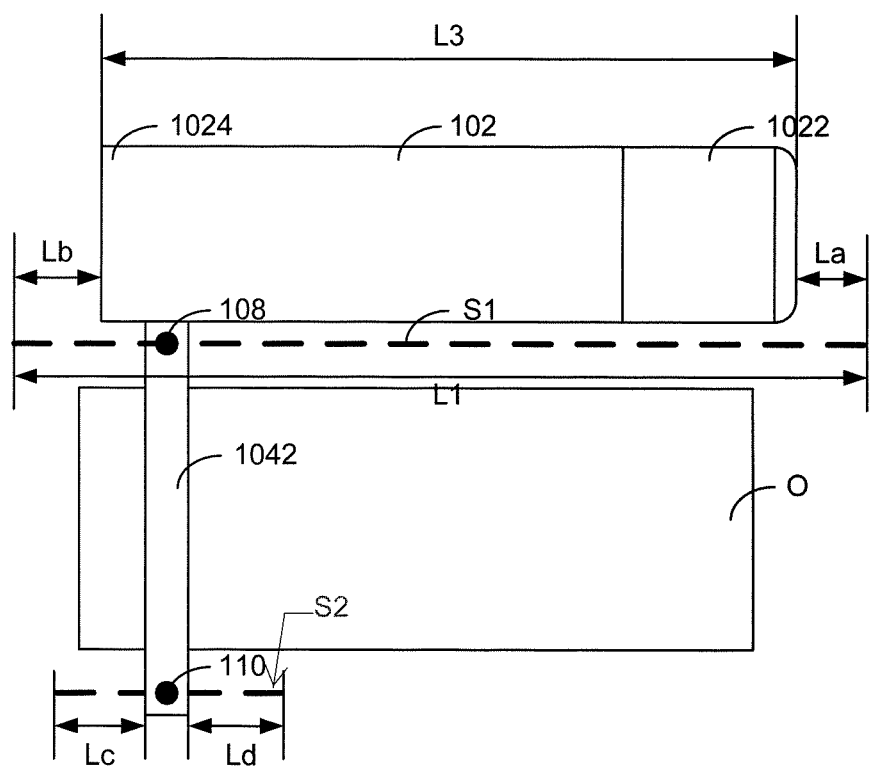
FIG. 2 is a top view of the mobile scanning inspection system shown in FIG. 1.
Figure 3:
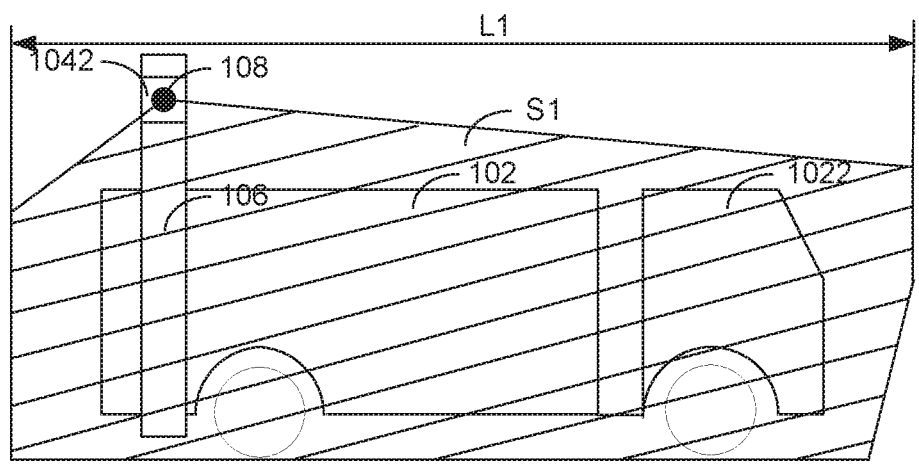
FIG. 3 is a side view of the mobile scanning inspection system shown in FIG. 1.

FIG. 2 is a top view of the mobile scanning inspection system shown in FIG. 1. FIG. 3 is a side view of the mobile scanning inspection system shown in FIG. 1. As shown in FIG. 2 and FIG. 3, the first inspection device 108 and the second inspection device 110 are provided on the cross arm 1042, respectively. Wherein the first inspection device 108 is arranged on the side close to the vehicle body 102 and a first laser inspection plane S1 (as shown by a dotted line on the side in the vicinity of the vehicle body 102 in FIG. 2) emitted from the first inspection device 108 is parallel to the side plane of the vehicle body 102 and the length L1 of the longest portion of the first laser inspection plane S1 is longer than the length L3 of the vehicle body 102. In some embodiments, for example, the longest portion of the first laser inspection plane S1 extends a preset distance La before the front head 1022 of the vehicle body 102 and a preset distance Lb after the rear end 1024 of the vehicle body 102, respectively. In some embodiments, La and Lb are, for example, 1 meter, since the length L3 of the vehicle body 102 is usually about 10 meters, the length L1 of the longest portion of the first laser inspection plane S1 is about 12 meters. It should be noted that this value is only an example, rather than limiting the application. In practical applications, the values of the lengths can be set according to actual needs. In addition, in order to comprehensively protect the vehicle body 102, the first laser inspection plane S1 will be higher than the front head 1022 and the rear end 1024.

With reference to FIG. 2, the second inspection device 110 is provided on the side close to the vertical arm 1044 (not shown in FIG. 2) and a second laser inspection plane S2 emitted from the second inspection device 110 is parallel to the side plane of the vehicle body 102 and the second laser inspection plane S2 is centered around the cross arm 1042, and extends a preset distance Lc and a preset distance Ld forward and backward. The second laser inspection plane S2 may be used to protect the vertical arm 1044. In some embodiments, Lc and Ld both equal to, for example, 1 meter, in addition to the normal width of the vertical arm which is 1.2 m, thus the second laser inspection plane S2 has a protection length of about 3.2 m. It should be noted that this value is only an example, rather than limiting the present application, in practical application, can be set according to actual needs.

In some embodiments, the first inspection device 108 and the second inspection device 110 may be regional laser scanners, such as a regional laser scanner of the type TiM351 provided by SICK, Germany. The regional laser scanners replace the existing bumper bar, which are mounted on both sides of the cross arm 1042. The regional laser scanners emit a laser fan parallel to the side of the vehicle body 102 in a way of circular scanning to inspect a preset size object that is encountered during the movement of the vehicle body 102 so that the vehicle body 102, the inspection arm 104, and the inspection arm support 106 is plane-protected. In addition, the first inspection device 108 and the second inspection device 110 may be other sensors having a laser scanning function, and the present application is not limited thereto.

Figure 4:
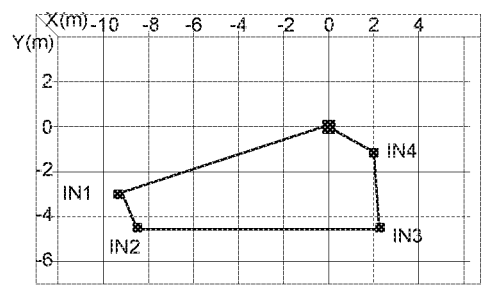
FIG. 4 is a schematic diagram of the adjustment interface of the first laser inspection plane coverage area shown in an example.
Figure 5:
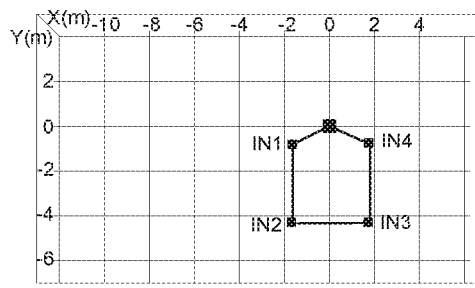
FIG. 5 is a schematic diagram of the adjustment interface of the second laser inspection plane coverage area shown in an example.

The coverage area of the first laser inspection plane S1 and the second laser inspection plane S2 may be adjusted according to user settings. For example, the first inspection device 108 and the second inspection device 110 may be connected to an electronic equipment (e.g., a debug computer, a server, and etc.) via a network, such as via an Ethernet connection, to receive user setting instructions sent by the electronic equipment so that the user can adjust the sizes of the coverage areas of the first laser inspection plane S1 and the second laser inspection plane S2 by the setting interface provided by the electronic equipment. FIG. 4 is a schematic diagram of the adjustment interface of the first laser inspection plane coverage area shown in an example FIG. 5 is a schematic diagram of the adjustment interface of the second laser inspection plane coverage area shown in an example. As shown in FIG. 4 and FIG. 5, the coverage areas of the first laser inspection plane S1 and the second laser inspection plane S2 can be determined by adjusting the four input points IN1 to IN4 in the figure, respectively. A plurality of sets of the drawn coverage area of the first laser inspection plane S1 or the second laser inspection plane S2 can be simultaneously recorded in each of the regional laser scanners.

Figure 6:
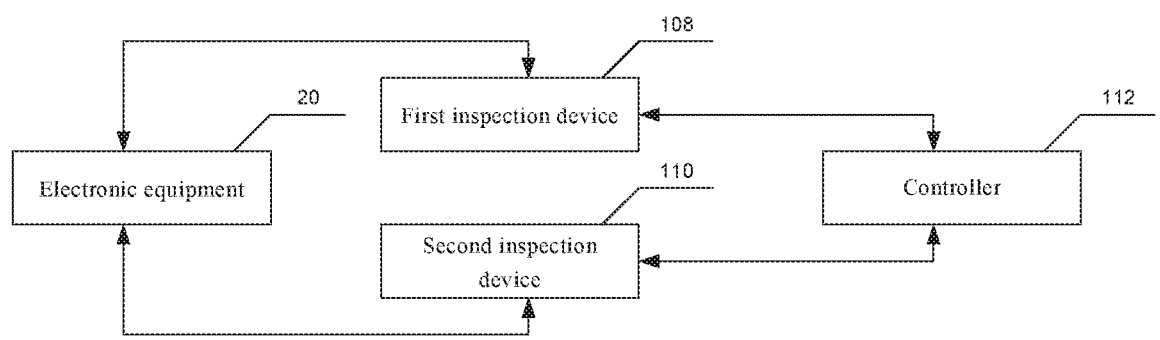
FIG. 6 is an interconnection diagram of a first inspection device and a second inspection device according to an example.

FIG. 6 is an interconnection diagram of a first inspection device and a second inspection device according to an example. As shown in FIG. 6, the first inspection device 108 and the second inspection device 110 are connected to the electronic equipment 20 via the network to receive a coverage area of the first laser inspection plane S1 and the second laser inspection plane S2 set by the user through the electronic equipment. In addition, the first inspection device 108 and the second inspection device 110 are also connected to the controller 112 of the mobile scanning inspection system 10. The controller 112 may be, for example, a PLC (Programmable Logic Controller), or may be a single chip or the like. When the above-described coverage area is selected, for example, four input points IN1 to IN4 of the regional laser scanner can be controlled by the four output points of the PLC connected to the first inspection device 108 and the second inspection device 110 to select which group of protection area is enabled.

In the scanning inspection process, as shown in FIG. 2, the object to be inspected O is placed in the inspection tunnel formed by the first laser inspection plane S1 and the second laser inspection plane S2, the first inspection device 108 and/or the second inspection device 110 may issue an alarm signal to the controller 112 when the first inspection device 108 and/or the second inspection device 110 inspect a preset size of an object. When the controller 112 receives the alarm signal from the first inspection device 108 and/or the second inspection device 110, the controller 112 immediately controls the vehicle body 102 to stop moving, so as to prevent collisions.

Figure 7:
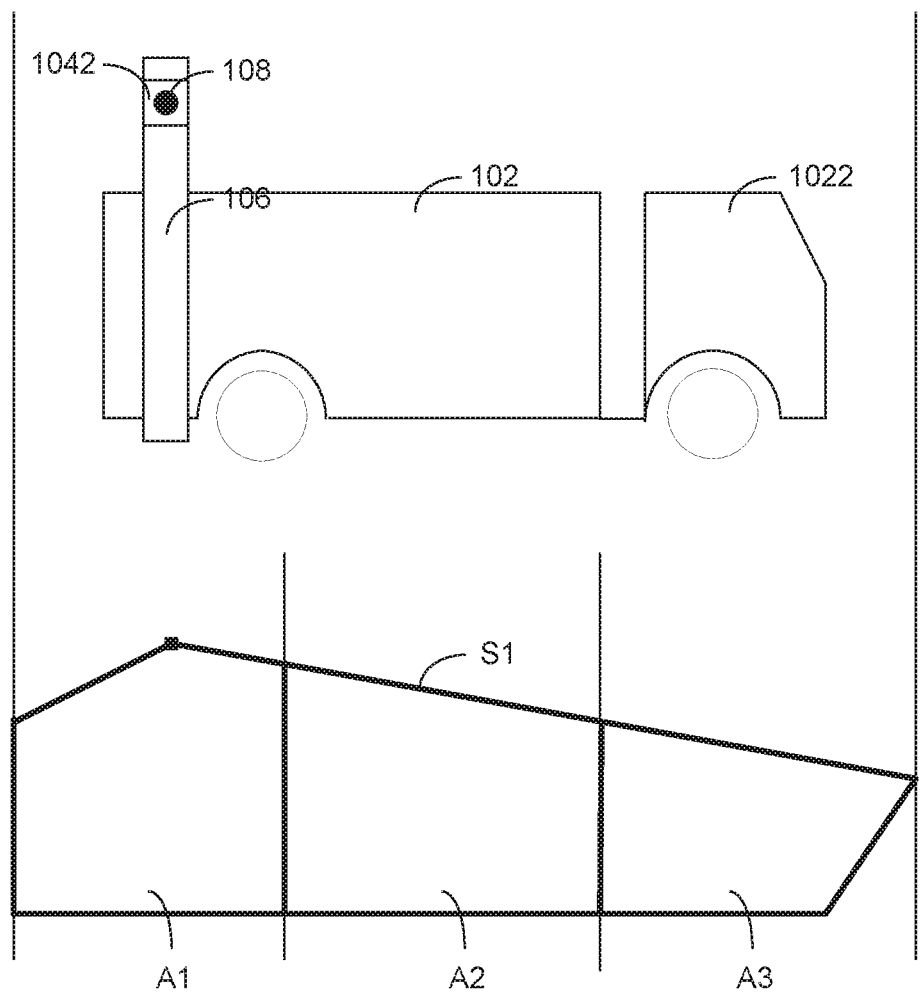
FIG. 7 is a schematic diagram of the partitions of the first laser inspection plane.

In addition, the mobile scanning inspection system 10 of the present application provides a collision prevention scheme for divided regions. FIG. 7 is a schematic diagram of the partitions of the first laser inspection plane. As shown in FIG. 7, the first laser inspection plane S1 may be divided into a plurality of inspection regions. Taking the case where the first inspection device 108 is a regional laser scanner as an example, the regional laser scanner has four output signals, one of which is status output of the sensor itself, so that the signal outputted from the remaining three output signals can be used as an alarm signal to alert the controller 112. The first laser inspection plane S1 is divided into three inspection regions: a first inspection region A1, a second inspection region A2, and a third inspection region A3, wherein the first inspection region A1 is the inspection region closest to the rear end 1024. It should be noted that the division of the inspection region in the figure is merely an example, and not a limitation of the present application.

When the first inspection device 108 inspects an object of a preset size in the first inspection region A1, all of the first inspection region A1, the second inspection region A2 and the third inspection region A3 are simultaneously triggered, and the first inspection device 108 outputs a signal 000 indicating that a collision will occur in all the first inspection region A1, the second inspection region A2, and the third inspection region A3.

When the first inspection device 108 inspects an object of a preset size in the second inspection region A2, both of the second inspection region A2 and the third inspection region A3 are simultaneously triggered, and the first inspection device 108 outputs a signal 100 indicating that a collision will occur in both the second inspection region A2 and the third inspection region A3.

When the first inspection device 108 inspects an object of a preset size in the third inspection region A3, only the third inspection region A3 is triggered, and the first inspection device 108 outputs a signal 110 indicating that a collision will occur in the third inspection region A3.

The collision prevention scheme for divided regions can visually indicate or show in which inspection region may occur collision, and thus facilitates the operator's subsequent analysis and processing.

Alternatively, the first laser inspection plane S1 may also be divided into two inspection regions (not shown): a first inspection region and a second inspection region, wherein the first inspection region is the inspection region closest to the rear end. When the first inspection device 108 inspects an object of a preset size in the first inspection region, a first alarm signal is issued to indicate that a collision will occur in both the first inspection region and the second inspection region; when the first inspection device 108 inspects an object of a preset size in the second inspection region, a second alarm signal is issued to indicate that a collision will occur in the second inspection region.

In addition, the first laser inspection plane S1 may be divided into more than three inspection regions (not shown) when the first inspection device 108 may provide more than three alarm signals. The plurality of inspection regions may include other inspection regions in addition to the first inspection region, the second inspection region and the third inspection region. Among them, the first inspection region is the inspection region closest to the rear end. When the first inspection device 108 inspects an object of a preset size in the first inspection region, a first alarm signal is issued to indicate that a collision will occur in all of the plurality of inspection regions; when the first inspection device 108 inspects an object of a preset size in the second inspection region, a second alarm signal is issued to indicate that a collision will occur in all of the plurality of inspection regions except for the first inspection region; when the first inspection device 108 inspects an object of a preset size in the third inspection region, a third alarm signal is issued to indicate that all of the plurality of inspection regions except the first inspection region and the second inspection region collision; and so on.

The mobile scanning inspection system of the present application extends the point protection in the prior art to the plane protection, which greatly reduces the probability of collision between the mobile scanning inspection system and the scanned object. And because the coverage of the laser inspection plane is very wide, it is possible for the user to determine whether or not a collision occurs in the stage of the object to be inspected being placed before the start of the scanning, thereby effectively avoiding the risk by prompting. In addition, the anti-collision method for divided regions can directly indicate or show which inspection region has collided, so as to facilitate the subsequent analysis and processing of the operator.

Figure 8:
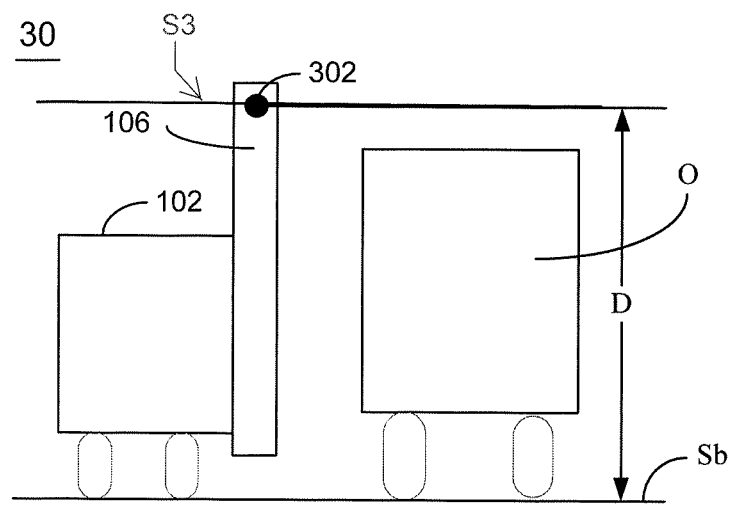
FIG. 8 is a schematic diagram of another mobile scanning inspection system according to an exemplary embodiment.

FIG. 8 is a schematic diagram of another mobile scanning inspection system according to an exemplary embodiment. The difference from the mobile scanning inspection system 10 shown in FIG. 1 is that the mobile scanning inspection system 30 shown in FIG. 8 further includes: a third inspection device 302. The third inspection device 302 is placed on the inspection arm support 106 at a preset distance D from the bottom plane Sb of the inspection tunnel, where the object to be inspected O can be either a vehicle or a container to be scanned or the like. In practical applications, the preset distance D may be set according to actual needs, for example, according to the highest height of the object to be inspected O that may be passed, thereby providing height-exceeding protection to the inspection arm support 106.

The third laser inspection plane S3 emitted from the third inspection device 302 is parallel to the bottom plane Sb of the inspection tunnel. When the scanned vehicle exceeding the height limit is scanned through the inspection tunnel by the third inspection device 302, the third inspection device 302 outputs a signal to the connected controller 112 so that the controller 112 controls the mobile scanning inspection system 20 to issue an alarm information for exceeding the height limit, thus warning the driver of the vehicle being scanned that the vehicle exceeds the height limit, and is prohibited from entering the inspection tunnel.

In some embodiments, the third inspection device 302 may also be a regional laser scanner.

The mobile scanning inspection system of embodiment of the present application further provides a height-exceeding anti-collision protection scheme for the height of the boom, which can effectively avoid the entry of the scanned vehicle with over-limit height.

Exemplary embodiments of the present application have been particularly shown and described above. It is to be understood that the present application is not limited to the detailed construction, arrangement or implementation described herein; rather, the present application is intended to cover various modifications and equivalent arrangements included within the spirit and scope of the appended claims.

What is claimed is:

1. A mobile, vehicle-mounted scanning inspection system, comprising:
    a controller coupled to a first inspection device and a second inspection device,
    a vehicle body having an inspection arm support to support an inspection arm,
    the inspection arm including a cross arm and a vertical arm to define an L-shape that is deployed in use to define an inspection tunnel in which an object to be inspected is placed,
    the cross arm having the first inspection device and the second inspection device,
    the first inspection device is arranged on an end of the cross arm positioned to enable identification of potential collisions with the vehicle body and the second inspection device is arranged on an opposite end of the cross arm positioned to enable identification of potential collisions with the vertical arm, a distance between the first inspection device and the vehicle body is smaller than a distance between the second inspection device and the vehicle body, and a distance between the second inspection device and the vertical arm is smaller than a distance between the first inspection device and the vertical arm,
    the controller configured to output four output points to control the first inspection device via four input points for selecting a coverage area of the first inspection device, the coverage area and the position of the first inspection device defining a first laser inspection plane, the first inspection device being configured to emit a laser by way of a circular scanning according to the four output points received from the controller, the first laser inspection plane being parallel to the vehicle body, and a length of the longest portion of the first laser inspection plane being longer than a length of the vehicle body, the emitted laser by way of the circular scanning being adjustable by the four input points to scan objects of irregular shapes; and the controller configured to output four output points to control the second inspection device via four input points for selecting a coverage area of the second inspection device, the coverage area and the position of the second inspection device defining a second laser inspection plane, the second inspection device being configured to emit a laser by way of a circular scanning according to the four output points received from the controller, the second laser inspection plane being parallel to the vehicle body, and the second laser inspection plane being centered on the cross arm, and extending a first preset distance and a second preset distance forward and backward of the cross arm, the emitted laser by way of the circular scanning being adjustable by the four input points to scan objects of irregular shapes, wherein the object is at least between the first laser inspection plane and the second laser inspection plane, at least one of the first inspection device and the second inspection device is configured to issue an alarm signal when the respective at least one of first inspection device and the second inspection device inspects an object exceeding a preset size, wherein the first laser inspection plane is divided into a first inspection region and a second inspection region adjacent to each other, the first inspection region being closest to the rear of the vehicle body, wherein the first inspection device is configured to issue the alarm signal which comprises at least one of a first alarm signal and a second alarm signal, when the first inspection device inspects the object in the first inspection region, the first inspection device is configured to issue the first alarm signal corresponding to the first inspection region and the second inspection region based on the inspection, when the first inspection device inspects the object in the second inspection region, the first inspection device is configured to issue the second alarm signal corresponding to the second inspection region based on the inspection.

2. The system according to claim 1, wherein the controller is configured to stop the movement of the vehicle body when the alarm signal from the at least one of the first inspection device and the second inspection device is received.

3. The system according to claim 1, wherein the first laser inspection plane is divided into a plurality of inspection regions, including the first inspection region, the second inspection region and a third inspection region adjacent to the second region, wherein the first inspection device is configured to issue the alarm signal which comprises at least one of a first alarm signal, a second alarm signal and a third alarm signal; when the first inspection device inspects the object in the first inspection region, the first inspection device is configured to issue the first alarm signal corresponding to each of the plurality of inspection regions based on the inspection; when the first inspection device inspects the object in the second inspection region, the first inspection device is configured to issue the second alarm signal corresponding to each of the plurality of inspection regions other than the first inspection region based on the inspection; when the first inspection device inspects the object in the third inspection region, the first inspection device is configured to issue the third alarm signal corresponding to each of the plurality of inspection regions other than the first inspection region and the second inspection region based on the inspection.

4. The system according to claim 1, wherein the coverage area for the first inspection device and the second inspection device are set according to user settings.

5. The system according to claim 4, wherein the first inspection device and the second inspection device are connected to an electronic equipment network, and receive the user settings transmitted by the electronic equipment.

6. The system according to claim 1, wherein the first inspection device and the second inspection device are both regional laser scanners.

7. The system according to claim 1, wherein the controller is a programmable logic controller.

8. The system according to claim 1, wherein the first preset distance is equal to the second preset distance and both are 1 meter.

9. The system according to claim 1, wherein the longest portion of the first laser inspection plane extends a third preset distance before the front head of the vehicle body and a fourth preset distance after the rear end of the vehicle body, respectively.

10. The system according to claim 1, wherein the inspection arm support has a third inspection device; wherein the third inspection device is arranged on the inspection arm support at a preset height from a bottom plane of the inspection tunnel formed by the cross arm and the vertical arm; the third inspection device is configured to emit a laser by way of a circular scanning, where a circular movement of the emitted laser defines a third laser inspection plane, the third laser inspection plane is parallel to the bottom plane of the inspection tunnel; and wherein the preset height is set in accordance with the height of the object to be inspected.

11. The system according to claim 10, wherein the third inspection device is an regional laser scanner coupled to the controller; when the third inspection device inspects an object exceeding the preset height, a signal is output to the controller to instruct the controller to issue an alarm.

12. The system according to claim 10, wherein the inspection arm has an inspection position for inspecting an object and a retracted position and when the inspection is complete, the inspection arm is configured to retract to the retracted position.

* * * * *